United States Patent
Burke, Jr. et al.

(10) Patent No.: US 8,982,391 B2
(45) Date of Patent: Mar. 17, 2015

(54) METHOD AND SYSTEM FOR PRINT DRIVER BASED INFORMATION EXCHANGE

(71) Applicant: Xerox Corporation, Norwalk, CT (US)

(72) Inventors: Robert William Burke, Jr., Stanley, NY (US); Stephen M. Roberts, Lake Oswego, OR (US); Daniel L. McCue, III, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/930,998

(22) Filed: Jun. 28, 2013

(65) Prior Publication Data
US 2015/0002870 A1    Jan. 1, 2015

(51) Int. Cl.
*G06F 3/12* (2006.01)
(52) U.S. Cl.
CPC ............ *G06F 3/1286* (2013.01); *G06F 3/1204* (2013.01); *G06F 3/1228* (2013.01); *G06F 3/1268* (2013.01)
USPC ........... 358/1.15; 358/1.9; 358/3.28; 358/470
(58) Field of Classification Search
CPC .............................. G06K 19/06; G06Q 30/00
USPC ................. 358/1.15, 3.28, 470, 1.9
See application file for complete search history.

(56) References Cited

U.S. PATENT DOCUMENTS

| | | | |
|---|---|---|---|
| 7,474,433 B2 | 1/2009 | Snyder | |
| 7,822,411 B2 * | 10/2010 | Nakatani | 455/420 |
| 7,969,603 B2 | 6/2011 | Snyder | |
| 2006/0052055 A1 | 3/2006 | Rowse et al. | |
| 2008/0204774 A1 * | 8/2008 | Matsushima | 358/1.9 |
| 2010/0225957 A1 * | 9/2010 | Liu | 358/1.15 |
| 2012/0008161 A1 | 1/2012 | Rouhana | |
| 2013/0032634 A1 * | 2/2013 | McKirdy | 235/375 |
| 2013/0072304 A1 * | 3/2013 | Brosnan et al. | 463/42 |
| 2013/0086427 A1 * | 4/2013 | Bae et al. | 714/37 |
| 2013/0114100 A1 * | 5/2013 | Torii et al. | 358/1.14 |
| 2013/0155441 A1 * | 6/2013 | Hong et al. | 358/1.14 |
| 2013/0235422 A1 * | 9/2013 | Nakata | 358/1.15 |
| 2013/0257589 A1 * | 10/2013 | Mohiuddin et al. | 340/5.61 |
| 2014/0046492 A1 * | 2/2014 | Broselow | 700/283 |

\* cited by examiner

*Primary Examiner* — Benny Q Tieu
*Assistant Examiner* — Quyen V Ngo
(74) *Attorney, Agent, or Firm* — Fox Rothschild LLP

(57) ABSTRACT

In a system where a print device is connected to a computing device but not to an external web service that relates to the print device, the computing device implements a print driver session that retrieves print device operational data, identifies the web service, and generates a barcode that encodes the device operational data as a data string with a web address for a web service. A user may use a mobile electronic device to receive an image of the generated barcode, decode the barcode to detect the web address and the device operational data, and send a web service request comprising the device operational data to a web service associated with the web address. When the mobile electronic device receives a response that is responsive to the web service request, it may present the response to a user via a display of the mobile electronic device.

28 Claims, 10 Drawing Sheets

FIG. 7

METHOD AND SYSTEM FOR PRINT DRIVER BASED INFORMATION EXCHANGE

RELATED APPLICATIONS

This document is related to U.S. patent application Ser. No. 13/632,638, filed Oct. 1, 2012, titled "Non-Connected Product Data Exchange Via Symbology," the disclosure of which is hereby incorporated by reference in its entirety.

BACKGROUND

This document relates generally to secure systems and methods for using mobile electronic devices for capturing and transmitting information from print devices to other devices.

In many office environments, print devices such as printers, copiers and scanners are connected to a local network. The local network may be an office network, or it may be a network for a group of related entities under common control, such as individual offices of a multi-office business. However, the print device, and often the entire local network itself, may have limited or no capability for communicating with systems outside of the local network. This may happen, for example, if the print device is behind a firewall of the local network.

While the isolation of print devices within a local network can help to maintain security of the device, it can make it difficult to service or maintain the device from a remote location. The process of obtaining data from a local print device and getting that data to a remote facility is still largely a manual process, often performed when a local person and remote technician are on the phone with each other.

This document describes methods and systems that are developed with the goal of addressing at least some of the problems described above, and/or additional problems.

SUMMARY

In an embodiment, a system including a computer and a connected print device implements a method of providing print device data to an external system, such as a web service. The computer includes a print driver with programming instructions that cause a processor of the computer to implement a print driver session so that the session causes the computer to retrieve device operational data from a print device that is associated with the print driver. The computer generates a barcode by encoding the device operational data as a data string with a web address for a web service to which the printer has no electronic communication connection, and outputs the generated barcode. The system also may include a mobile electronic device that executes a barcode reading application to receive an image of the generated barcode, decode the barcode to detect the web address and the device operational data, and send a web service request comprising the device operational data to a web service associated with the web address. When the mobile electronic device receives a response that is responsive to the web service request, it may output the response such as by displaying any or all of the response to a user via a display of the mobile electronic device.

Optionally, after the retrieving and before the generating, the computing device may determine that the print device operational data satisfies a condition for which the web service is available. If so, it may present, to the user, an option to generate a two-dimensional barcode that enables the user to request the web service. In this embodiment, generating the barcode will be done in response to receiving a user acceptance of the option. Alternatively, after the retrieving and before the generating, the computing device may determine that the print device operational data satisfies a condition for which the web service is available, and it may determine that the print device operational data satisfies a condition for which user intervention is not required. If so, generating the barcode may be performed automatically without user intervention.

Optionally, during the print driver session, the computing device may analyze the operational data, identify a category to which the operational data relates an identify the web service as a web service that corresponds to the category. If so, the computing device may attempt to transmit the operational data to the web service. If it determines that the attempt to transmit the data to the web service failed, then in response it may cause the computing device to automatically generate and present the barcode is prompted by the determination that the attempt to transmit the data to the web service failed.

Optionally, as part of the print driver session the computing device may output a graphical user interface to a user; display, via the graphical user interface, at least a portion of the retrieved device operational data; receive a user selection of a subset of the displayed operational data; identify a category to which the subset of the displayed operational data relates; select the web service as a web service that corresponds to the category; and cause the encoded device operational data to include the selected subset of the displayed operational data.

Optionally, as part of the print driver session the computing device may output a graphical user interface to a user; display, via the graphical user interface, a plurality of web services; receive a user selection of one of the displayed web services; retrieve the device operational data in response to the user selected web service, such that the retrieved device operational data comprises data that corresponds to a category to which the selected web service relates; use the user-selected web service as the web service that it encodes into the two-dimensional barcode; and use the retrieved operational data that corresponds to the category as the data string that it encodes into the two-dimensional barcode.

BRIEF DESCRIPTION OF THE DRAWINGS

FIG. 7 illustrates an example of a web session that is returned to a computing device from a web service after analyzing data that was encoded in a barcode.

DETAILED DESCRIPTION

Figure 1:
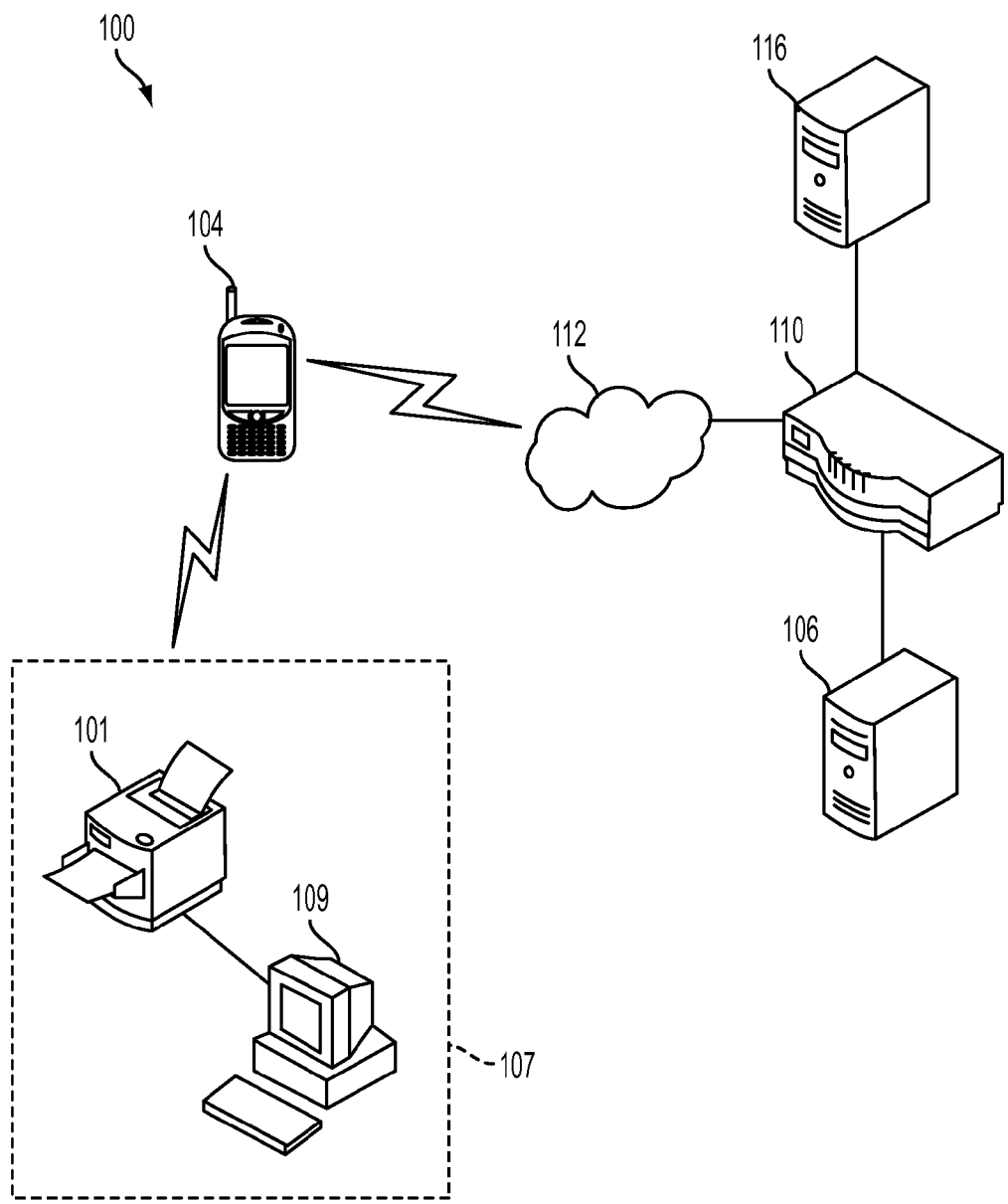
FIG. 1 is a block diagram of various elements of an example of a system as discussed below.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

As used in this document, a "barcode" refers to a pattern or symbol that is displayed on a display device or substrate and which represents encoded data. Barcodes may include, for example, one-dimensional symbologies, two-dimensional symbologies (such as matrix codes, Quick Response ("QR") codes, Aztec codes and the like), or three-dimensional symbologies. In this document, the terms "barcode" or "matrix code" may be used in the examples, but the term is intended to include any such symbology.

As used in this document, "electronic communication" refers to the ability to transmit data via one or more signals between two or more electronic devices, whether through a wired or wireless network, and whether directly or indirectly via one or more intermediary devices.

As used in this document, a "mobile electronic device" or "portable electronic device" refers to a portable computing device that includes an image capturing device, a processor and tangible, computer-readable memory. The memory may contain programming instructions in the form of a software application that, when executed by the processor, causes the device to perform one or image acquisition and processing operations according to the programming instructions. Examples of suitable devices include portable electronic devices such as smartphones, personal digital assistants, cameras, tablet devices, electronic readers, personal computers, media players, satellite navigation devices and the like.

As used in this document, a "print device" is an electronic device that is configured to perform one or more document processing functions on a substrate, such as printing, scanning, faxing and/or copying. The term "non-connected print device", as used herein with respect to a given network, refers to a print device that is absent of an interface to a remote network and/or that is not in electronic communication with other devices outside of a local network to which the print device is connected. This does not necessarily mean that the multi-functional device is devoid of any network connection but rather that it has no network connection outside of a local network, such as that to a remote service provider facility.

As used in this document, a "print driver" refers to a software element that is associated with a print device and which contains programming instructions that, when executed, convert data into a format suitable for printing by the associated print device. A print driver may be installed on a memory of a computing device that is in electronic communication with the print device, or it may be installed on the print device itself.

Referring now to FIG. 1, there is provided a schematic illustration of a system 100. The system 100 is generally configured to provide data exchange between computing systems and a remotely located, non-connected print device via barcode technology. In this regard, the system 100 comprises a print device 101 which exists on a local network that may be separated from one or more external networks 112 via a firewall 107. The print device may be in electronic communication with one or more computing devices 109 within the local network.

A separate service provider system 110 includes one or more diagnostic modules 106 and/or monitoring modules 116. The diagnostic modules 106 may include programming that, when executed, instructs a processor to diagnose one or more faults of the print device 101 when the service provider system 110 receives data for the print device 101. The monitoring modules 116 may include programming that, when executed, instructs a processor to retrieve one or more operational parameters of the print device 101 when the service provider system 110 receives such data for the print device 101. The monitoring modules 116 may use the operational parameters to diagnose a fault of the print device, determine when to order supplies, to determine what amounts to include in a service bill, or to take other actions relating to the print device.

As shown in FIG. 1, the print device 101 and connected computing device 109 reside at a facility of the customer, and the service provider system 110 resides in a facility of the service provider that is remote from the customer facility. Notably, in some embodiments, the print device 101 is a non-connected multi-functional device, i.e., it is not in electronic communication with the service provider system 110 via a public network 112 such as the Internet. Therefore, the requisite information cannot be communicated automatically from the print device 101 to the service provider system 110 via the public network 112.

However, the system 100 is designed to allow data exchange between the print device 101 and the service provider system 110 by using barcode technology and mobile electronic device technology to enable data exchanges between the print device 101 and external components. During a data exchange process, a print driver installed on the connected computing device 109 generates a barcode during a print driver session. Barcode technologies are well known in the art, and any now or hereafter known generation schema may be encoded in the print driver to generate the barcode. The computing device 109 will generate a barcode and display the barcode on its display, or it may instruct the print device 101 to print the barcode on a substrate. The mobile electronic device 104 will include an image sensor that captures an image of the barcode as displayed on the display or printed on the substrate. The device 104 will process the barcode to extract (decode) data from the barcode using a barcode scanner/reader application. Barcode scanners/readers are well known in the art. Any known or to be known barcode scanner/reader can be used without limitation.

The mobile electronic device 104 communicates all or a portion of the extracted data with the service provider system 110 via a public network 112 such as the Internet or a mobile phone network. The service provider system 110 may also communicate response messages to the mobile electronic device 104 via the network 112.

At the service provider system 110, the print device data may be processed for various reasons. For example, the print device data may be forwarded to and processed by a monitoring module 116 such as a billing system that uses the data to generate a bill, an ordering system that uses the data to determine whether to place orders for supplies, and/or a fault diagnosis sub-system 106 to identify device faults.

Figure 2A:
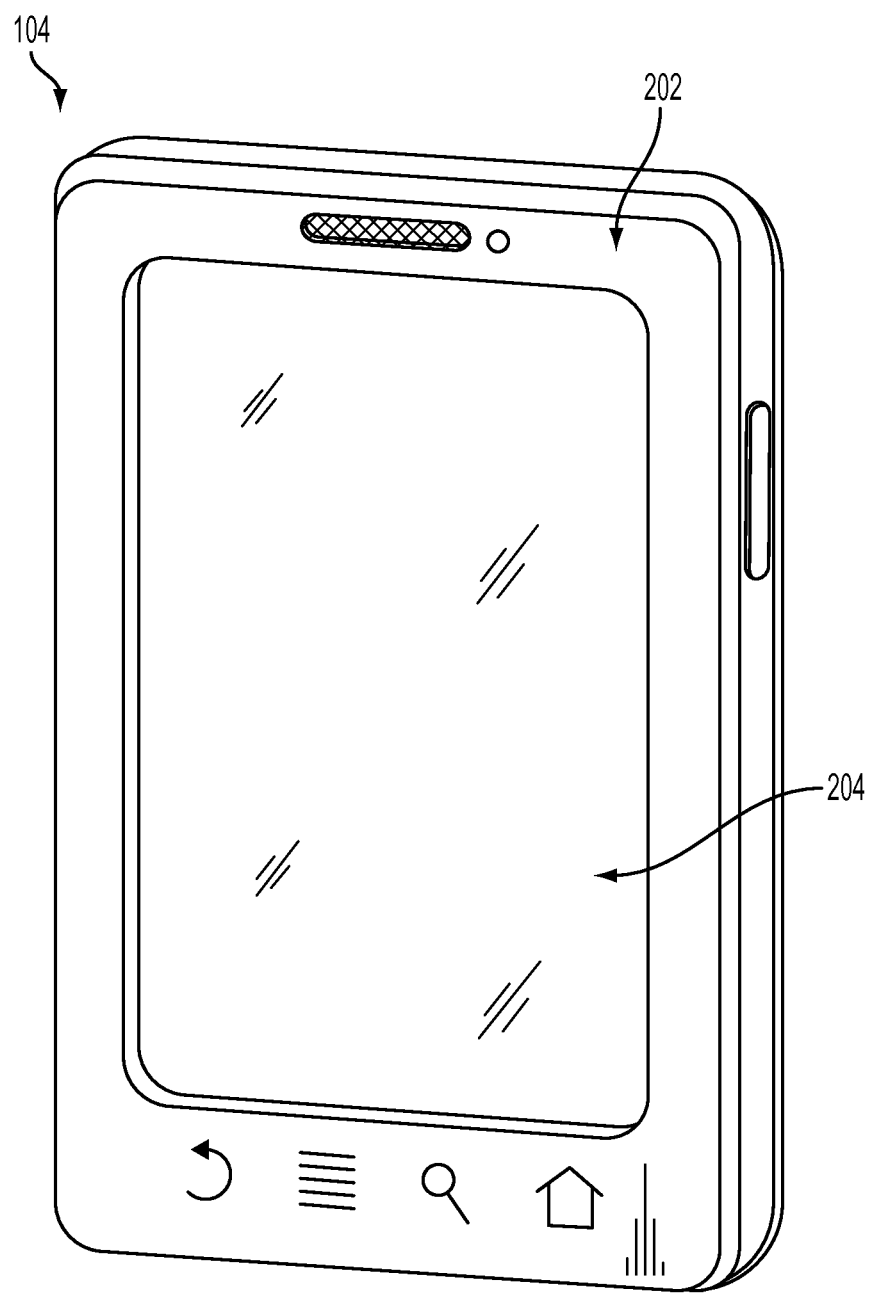
FIG. 2A illustrates a front face of an example of a mobile electronic device.
Figure 2B:
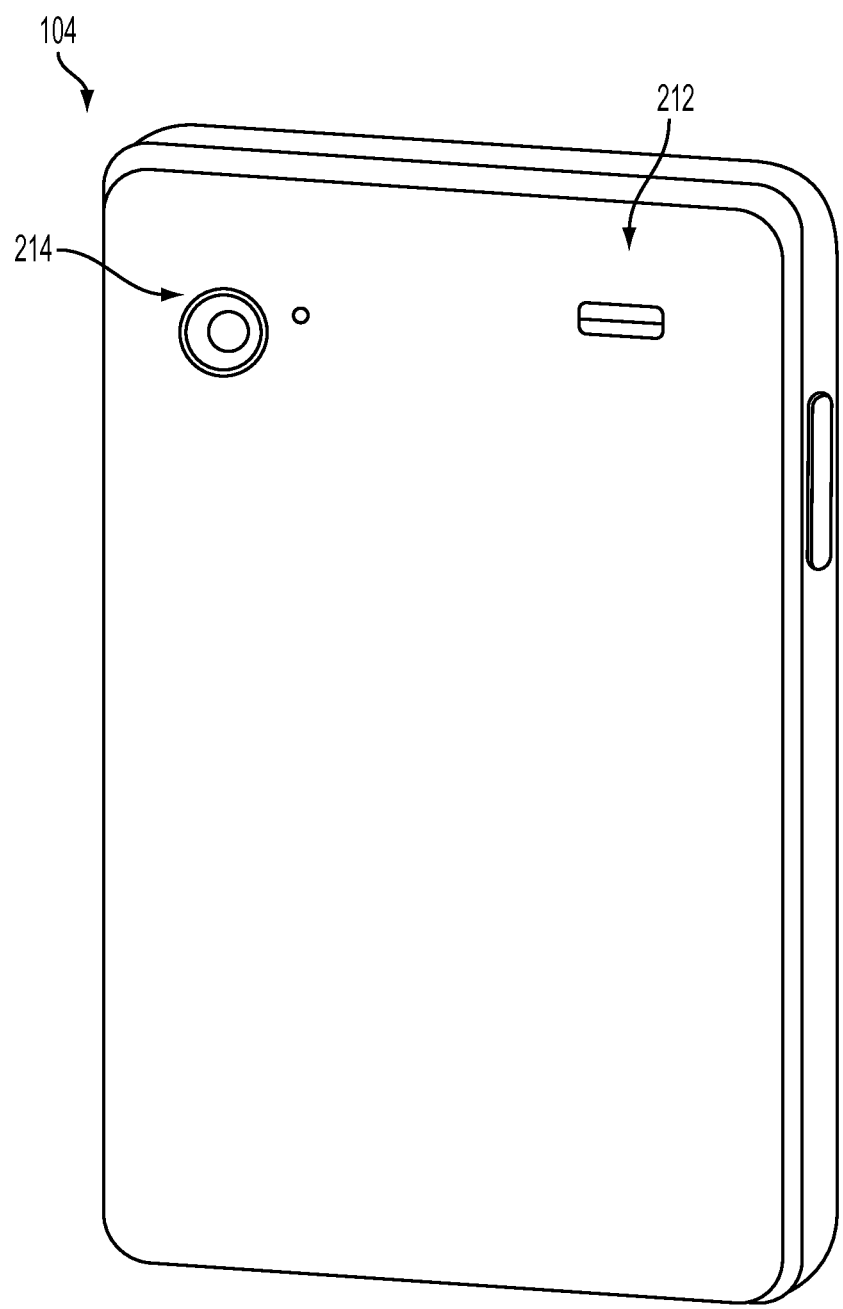
FIG. 2B illustrates a rear face of the example device.

FIGS. 2A and 2B illustrate one example of a mobile electronic device 104. The mobile electronic device 104 may include a front face 202 and a display 204. The display 204 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 204 may further include a touch sensitive screen, such as, but not limited to, a resistive touchscreen, capacitive touchscreen, or infrared touchscreen.

FIG. 2B shows a rear face 212 of the mobile electronic device 104. The rear face 212 may include an image capture device 214. The image capture device 214 may be any suitable component capable of receiving an optical image and transmitting the information to other components for processing. While the image capture device 214 is depicted on the rear face of the present example, persons skilled in the art will appreciate that the image capture device 214 may be positioned at any location upon any face of the electronic device 104, or may even be external to the electronic device 104 and connected by any means of electronic communication, including, but not limited to, physical cable communication such as universal serial bus (USB), wireless radio communication, wireless light communication, or near field communication technology.

As noted above, the mobile electronic device 104 also may include a processor and memory holding a barcode reader software application. Barcode readers are well known in the art, and therefore will not be described in detail herein. However, it should be understood that the barcode reader is generally configured to scan a barcode by processing the image received by the image sensor and process the scanned barcode to extract information therefrom.

Returning to FIG. 1, the mobile communication device's memory may include additional application software that can also facilitate the data exchange between a print device (e.g., computing device 109 of FIG. 1) and a service provider system. In this regard, the application software may perform one or more of the following actions: verify an identity of a user of the mobile communication device 104 via an authentication process (such as passcode entry or receipt of a biometric identifier); present information to the user indicating that her/his identity has been or has not been verified; communicate information to an external device (e.g., computing device 109 of FIG. 1) indicating that a user's identity has been or has not been verified; scan a barcode presented by the external device (e.g., print device 101 of FIG. 1); process the barcode to obtain a uniform reference locator (URL) that includes an associated data string, a device identifier and/or device data therefrom; automatically launch a web browser or a proprietary service application (not shown) in response to the reception of the barcode; access a server of an service provider system (e.g., server 110 of FIG. 1) using the previously launched web browser or a proprietary service application and the URL); automatically communicate the print device identifier and/or print device data string to the service provider system 110; receive response messages from the computing device of the service provider system; and/or output the response messages via a display and/or audio output.

Figure 3:
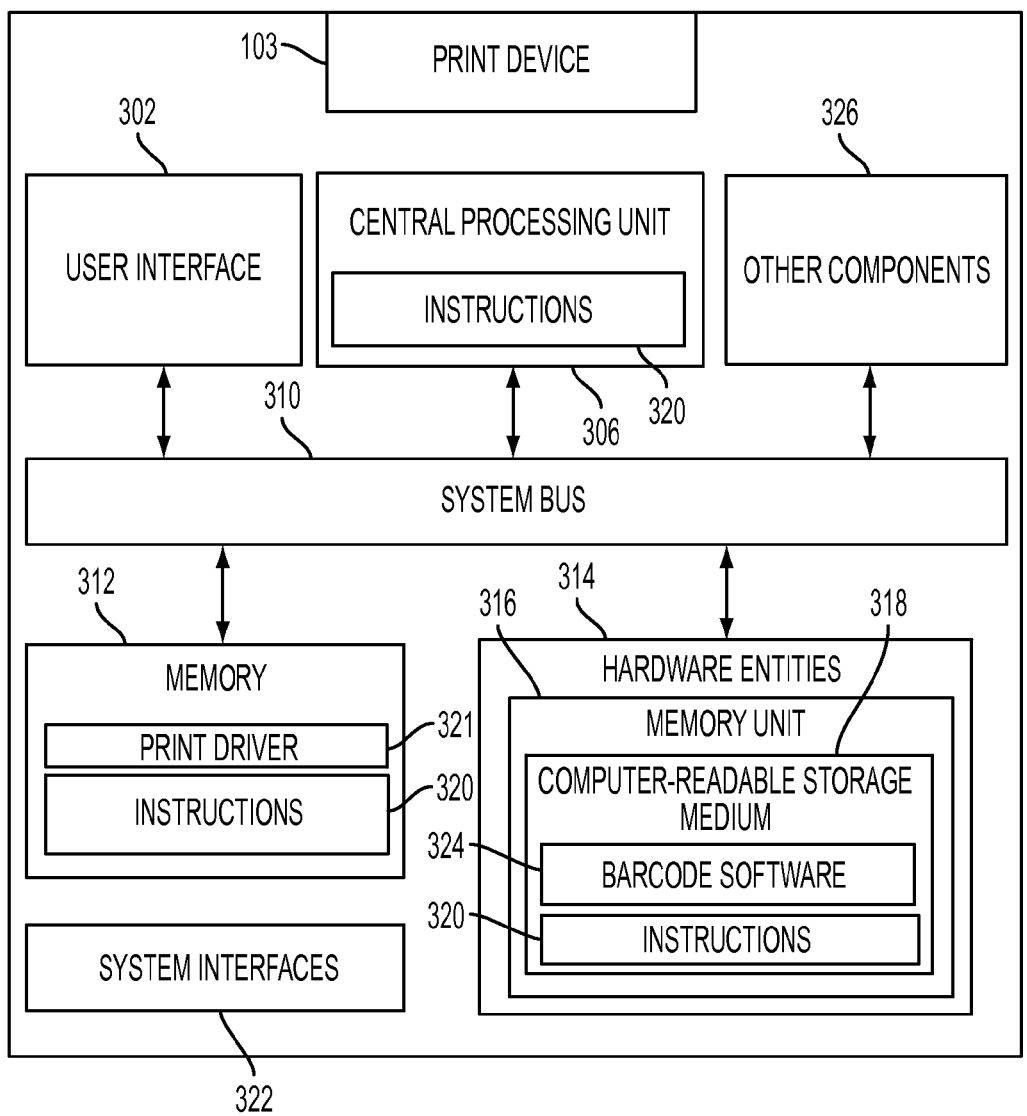
FIG. 3 is a schematic illustration of an architecture for an example of a print device.

Referring now to FIG. 3, there is provided a detailed block diagram of an example of various components of an example of a print device 103, which may in some embodiments correspond to print device 101 of FIG. 1. Some or all of the components of the print device 103 can be implemented as hardware, software and/or a combination of hardware and software. The hardware includes, but is not limited to, one or more electronic circuits. The print device 103 may include more or less components than those shown in FIG. 3. However, the components shown are sufficient to disclose an illustrative embodiment implementing the present invention.

As shown in FIG. 3, the print device 103 includes a system interface 322, a user interface 302, a central processing unit ("CPU") 306, a system bus 310, a memory 312 connected to and accessible by other portions of the print device 103 through system bus 310, and hardware entities 314 connected to system bus 310. The user interface comprises a display, or other communication medium, associated with the print device 103, whether mounted on the equipment or otherwise; and any software, resident at any location, that influences what is displayed or communicated at any time. At least some of the hardware entities 314 perform actions involving access to and use of memory 312, which can be a random access memory, a flash memory, a read only memory, or any other suitable memory device. System interface 322 allows the print device 103 to communicate directly or indirectly with external devices on the local network.

Hardware entities 314 can include a memory 316 comprising a non-transitory computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the print device 103. The memory 312 and the CPU 306 also can constitute machine-readable media. The term "machine-readable media," as used here, refers to a single medium or multiple media (e.g., a centralized or distributed database, and/or associated caches and servers) that store the one or more sets of instructions 320. The term "machine-readable media," as used here, also refers to any non-transitory medium that is capable of storing, encoding or carrying a set of instructions 320 for execution by the print device 103 and that cause the print device 103 to perform any one or more of the methodologies of the present disclosure.

Figure 4:
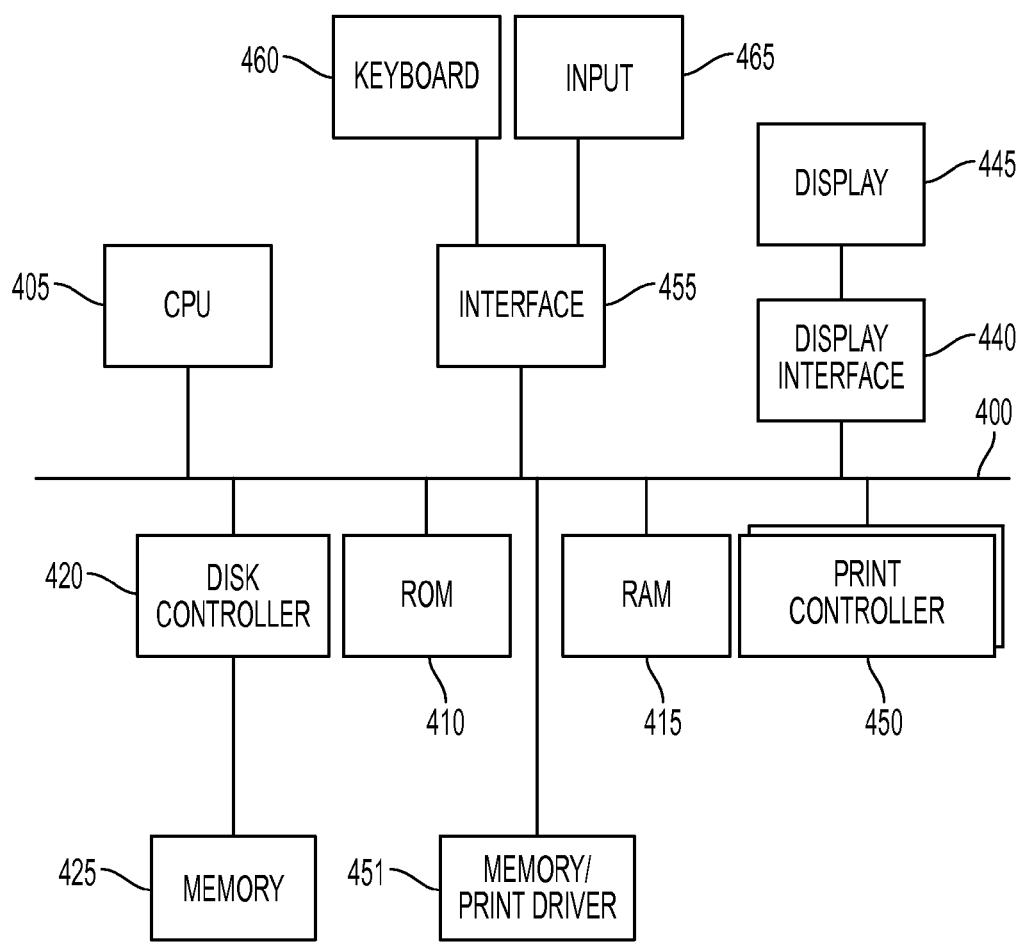
FIG. 4 is a schematic illustration of various elements of an example of a computing device and/or internal components of a mobile electronic device.

FIG. 4 is a block diagram of various hardware and software components that may form part of computing device 109. Some or all of the components of each device can be implemented as hardware, software and/or a combination of hardware and software. The hardware includes, but is not limited to, one or more electronic circuits. A bus 400 serves as an information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a processing device, computing device or processor as such terms are used within this disclosure. Read only memory (ROM) 410 and random access memory (RAM) 415 constitute examples of memory devices or processor-readable storage media.

A controller 420 interfaces with one or more optional non-transitory, computer-readable memory devices 425 to the system bus 400. These memory devices 425 may include, for example, a hard drive, flash memory, a USB drive or the like. As indicated previously, these various drives and controllers are optional devices.

An optional display interface 440 may permit information from the bus 400 to be displayed on the display 445 in audio, visual, graphic or alphanumeric format. For example, the display 445 may output the barcode so that it may be captured by a mobile electronic device. The hardware may also include an interface 455 which allows for receipt of data from input devices such as a keyboard 460 or other input device 465 such as a mouse, a joystick, a touch screen, a remote control, a pointing device, a video input device and/or an audio input device.

Communication with external devices, such as a print device, may occur using various communication ports such as a print controller port 450. Program instructions, software or interactive modules for providing the interface and performing any querying or analysis associated with one or more data sets may be stored in any of the memory devices. For example, any or all of the memory devices of the computing device 109 may include a print driver 451 that is used to convert data to a suitable format for printing by a connected print device.

Alternatively, or in addition, the memory of the print device also may include a print driver that serves to convert data into a formal suitable for printing by the print device. For example, FIG. 3 shows the print driver 321 installed in the memory 312 of the print device 103.

The print driver will also include programming instructions for generating and outputting a barcode during a print driver session. The barcode generation application of the print driver is operative to monitor operational parameters of the print device which correspond to one or more functional categories.

During the print driver session, the barcode generation application of the print driver may receive one or more operational parameters from the print device, determine a category to which the operational parameter relates, assign a URL for a web service based on the determined category; append a data string corresponding to the operational parameters to the URL, and generate a barcode that contains encoded data corresponding to the URL and appended data string. The application may determine the category based on user input, such as a process where a user selects a function and the system retrieves print device data corresponding to that function as described below. Alternatively, it may assign a category based on one or more characteristics of the data itself, such as a formal and/or metadata.

The operational parameters that the barcode generation application of the print driver may monitor, collect and store can include, but are not limited to, billing parameters, meter parameters, supply item usage parameters, device fault parameters, diagnostic/maintenance parameters, and/or device configuration parameters. The term "billing parameters," as used herein, refers to parameters that are useful for billing purposes. The terms "meter parameters" and "supply usage parameters," as used herein, refer to parameters specifying consumption by a customer. The term "device fault parameters," as used herein, refers to parameters specifying a quality of service provided by an electronic device or a quality of a product output by the electronic device. The term "diagnostic/maintenance parameters," as used herein, refers to parameters useful for diagnosing operational faults of an electronic device and/or useful for maintaining or servicing the electronic device. The term "device configuration parameters," as used herein, refers to parameters defining operational settings of an electronic device.

In document handling embodiments, the billing parameters can include total number of impressions, total number black impressions, total number of black copied impressions, total number of black printed impressions, and/or total number of colored impressions. The supply item usage parameters can include ink level, toner level, supply item usage, estimated pages remaining, and/or estimated days remaining.

The device fault parameters can include image quality parameters. The diagnostic/maintenance parameters can include estimated process duration parameters, fault code parameters, and/or device setting parameters. The device configuration parameters can include device identification parameters, tray configuration parameters, peripheral device identification parameters, peripheral device configuration parameters, and device setting parameters. The functional categories can include, but are not limited to, a machine configuration category, a software/network configuration category, a service activity category, a consumable item category, a supply usage category, a shipping address category, a meter read category, a billing category, a tool category, a maintenance category, and/or any other category relating to the operations/characteristics of the multi-functional device.

Examples of categories for print device data include those described above, such as billing parameters, meter parameters, supply item usage parameters, device fault parameters, diagnostic/maintenance parameters, and/or device configuration parameters. The print driver or a connected memory may contain a database of associated web service URLs for each category of data. For example, data categorized as a diagnostic maintenance parameter (such as a fault code) may be associated with a URL of a maintenance service. If so, the system may generate a barcode containing a URL and appended data string such as:

http://www.maintenancewebservice.com+{data string for maintenance parameters}

Alternatively, a user may select a customer self-help option, in which case the category will be determined to be a customer self-help service and the print driver will assign a URL for the customer self-help-service such as:

http://www.customerselfhelpwebservice.com+{data string for parameters based on customer selection}

Figure 5:
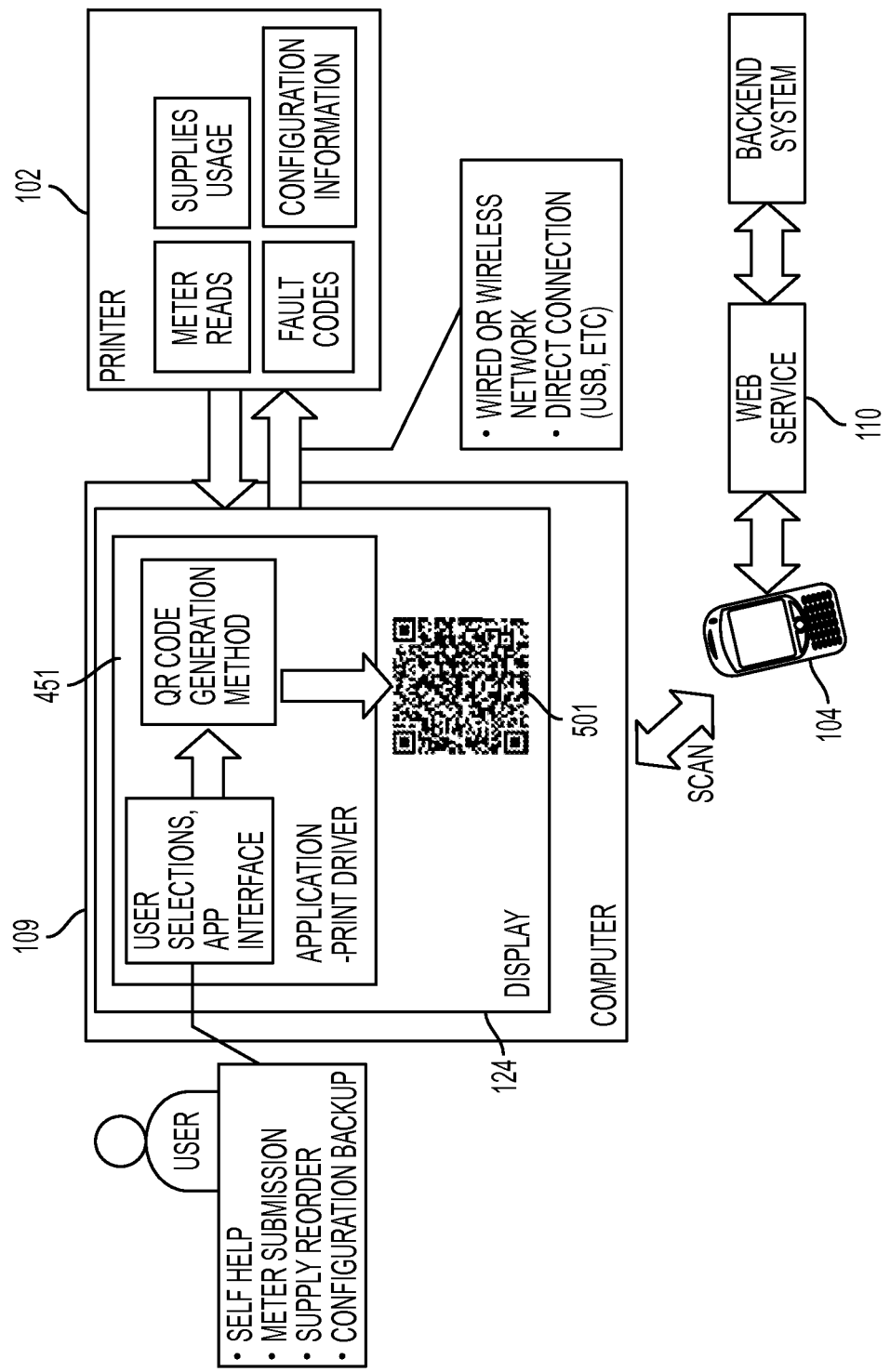
FIG. 5 is a block diagram illustrating how a system may operate to exchange information between a print device and a remote system.

FIG. 5 illustrates an example process of how a print driver may generate a barcode and how the system may use the barcode to take one or more actions. A user may access a user interface of a computing device 109 and/or a print device 102 to select one or more web service options for generation of a barcode 501. For example, the user interface may output a user-selectable set of options such as self-help, consumable item meter reading submissions (e.g., print device toner or paper usage); supplies reordering and/or an option to back up the print device's configuration parameters to the remote web service 110. Alternatively, the user may select an operational parameter that the print driver has retrieved, or which the user desires to retrieve, from the print device. If so, the print driver may determine a category that corresponds to the parameter and a web service that corresponds to the category.

In response to the user selection, the print driver 451 may initiate (or continue) a print driver session to retrieve one or more operational parameters from the print device. For example, in response to a consumable item meter reading submission request the print driver 451 may retrieve one or more meter reading values from the print device 102. In response to a supply reorder service submission request the print driver 451 may retrieve one or more supplies usage values from the print device 102. In response to a configuration backup submission request the print driver 451 may retrieve one or more configuration parameters from the print device 102. In response to a self-help submission request the print driver 451 may retrieve one or more meter reading values, supplies usage measurements, fault codes and/or configuration parameters from the print device 102.

The instructions contained in the print driver may cause the processor of the computer 109 to generate the barcode 501 and display the barcode on a display 124. The barcode may contain, in encoded form, a URL associated with the user-selected service, along with a data string that corresponds to the retrieved parameters. The printer 102 and/or computing device 109 may output the barcode via a display 124, or via causing the print device 102 to print the barcode on a substrate. When a mobile electronic device 104 scans the barcode 501, the device will decode the barcode to identify the URL and the appended data string. It will then send the data string to a web service 110 that is associated with the URL.

In response to receiving the data string, the web service 110 may return information to the mobile device 104, and the mobile device may output the information to a user. For example, if the web service is a maintenance service or customer self-help service, the service may process the data string (such as a fault code) to diagnose one or more maintenance issues, and it may return instructions to the mobile device that enable the user to help resolve the maintenance issue. If the web service is a supplies reordering service the service may process the data string (such as consumables usage data), determine a supply item that needs to be replenished based on the consumables usage data, and return to the mobile electronic device 104 a proposed or actual order for the supply item. The user may then have the opportunity to confirm and/or change the order via a user interface of the mobile electronic device 104. If the web service is a configuration backup service, the service may process the data to retrieve and store configuration parameters for the print device. Alternatively, if the data string includes a backup request and/or a null result, the configuration web service may return the configuration parameters to the mobile electronic device 104 for presentation to the user.

Figure 6:
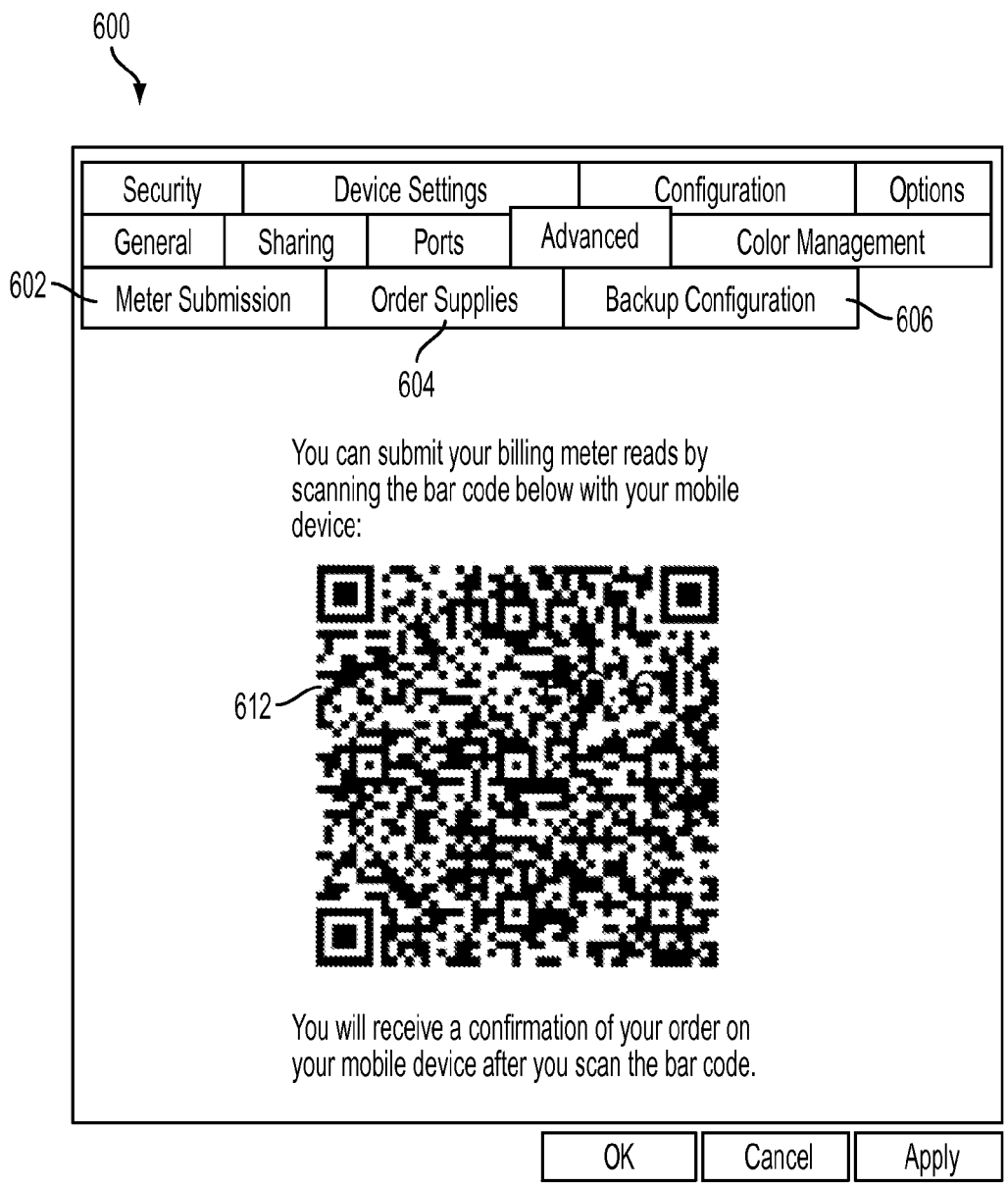
FIG. 6 illustrates an example of a graphical user interface for a user to control a print driver based barcode generation service.

The workflow described above may be facilitated by a graphical user interface ("GUI") for a print driver session that is presented to a user via a display of the computing device. A schematic illustration of a print driver session GUI 600 is provided in FIG. 6. As shown in FIG. 6, the GUI allows the users to receive meter reading data from the print device. Optionally, the print driver session GUI 600 includes input elements that allow a user to select various functions that may be implemented via a barcode such as retrieving meter readings 602 from the print device and encoding them into a barcode for submission to an external entity via a mobile electronic device; checking consumables levels of the print device and automatically generating a barcode comprising an order for supplies of consumables whose levels have fallen below an ordering threshold 604; or obtaining one or more configuration parameters from the print device 606 and encoding them into a barcode for capture and transmission to an external data backup data storage facility. The print driver session GUI 600 also may present the barcode 612, as generated by the computer using the print driver, via the display for capture by a mobile electronic device.

Figure 7:
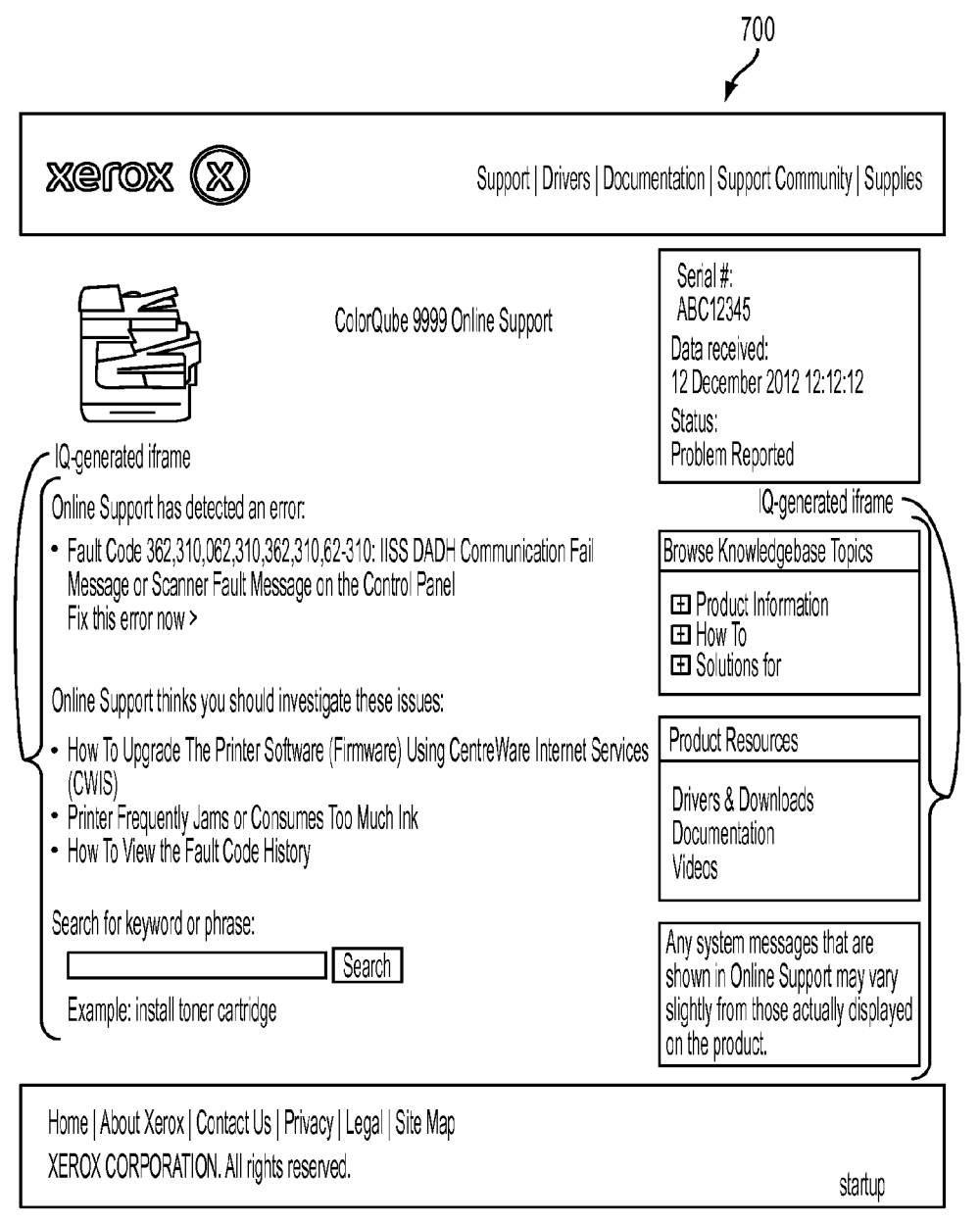

As noted above in the discussion of FIG. 5, the print driver session may cause the computing device to send print device data such as meter reads, fault codes and configuration data to a remote web service 110. The remote web service 110 may analyze the data and return a response to the mobile electronic device 104 via an application such as a web browser session. An example user interface 700 of such a browser session is shown in FIG. 7, in which the user interface displays information such as the printed fault codes received via the barcode, narrative information describing or diagnosing the faults, and information that helps the user resolve the faults or find solutions via another source.

Figure 8:
FIG. 8 is an example of a print driver session displaying a barcode.

Optionally, the print driver's barcode generation session may launch automatically, but only if and after requested by the user, or if and after the computing device attempts to transmit the print device data to an external web service for processing, but the transmission fails. Failure may be detected if the system does not receive a confirming response from the web service, or if the system does not receive a information such as that described in FIG. 7 above. FIG. 8 describes a print driver interface 800 in which a barcode 801 is automatically generated because an attempt to send the data via a network transmission failed. FIG. 8 also illustrates an example of the data 803 that may be encoded in the barcode 801.

Figure 9:
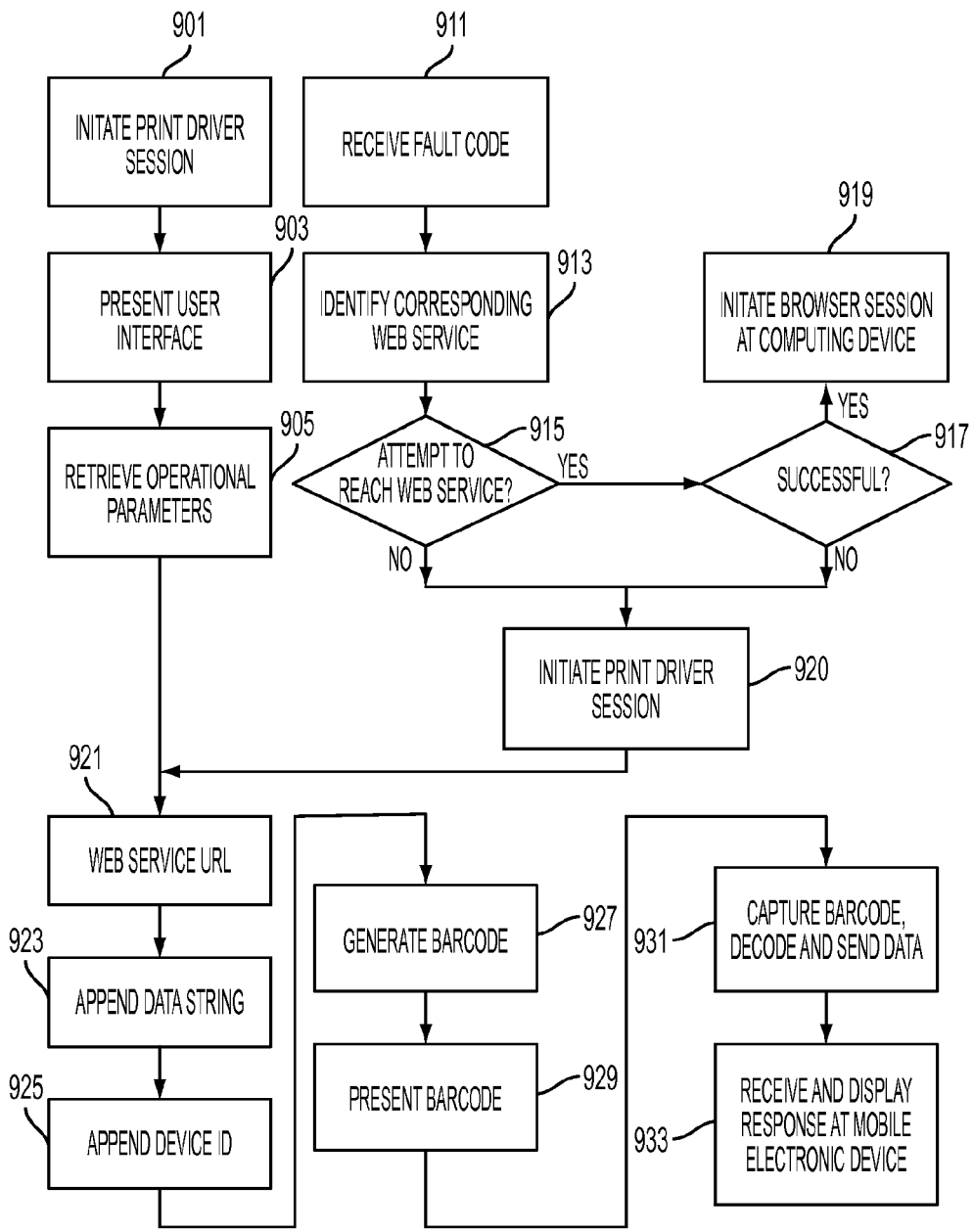
FIG. 9 is a flowchart illustrating an example of an information exchange process.

FIG. 9 is a flow diagram illustrating an example of a barcode generation process as implemented by a computing device during a print driver session. Optionally, the process may start by initiating a print driver session (step 901) in which the print driver programming instructions are executed by a computing device that is in electronic communication with the print device. This may occur automatically, such as in response to the computing device detecting that the print device is connected to the computing device. Or, it may be executed in response to a user input, such as a user command to print a document on the print device or a user command to troubleshoot the print device. Optionally, in order to verify that the user is an authorized user, or in order to determine what functions of the print driver session the user is authorized to access and/or control, the print driver session may require the user to present an authorization token such as a passcode, biometric identifier, access card, or near-field or short-range communication token such as a card with an RFID chip or a mobile electronic device with a Bluetooth® or similar function. If the system authenticates the user, the system may present the user with a user interface (step 903) through which the user may select one or more operational parameters and/or web services for a print device. (An example is shown in FIG. 6 above.) The print driver session may retrieve operational parameters that correspond to the user selection (step 905) and identify a web service (step 921) that corresponds to the user selection.

During the print driver session, the computing device will retrieve operational parameters that correspond to the user selection and append the operational parameters (step 923), optionally along with a device identifier for the print device (step 925), to the URL. The instructions contained in the print driver, when executed by a processor of the computing device will then encode the web service URL, a data string corresponding to the retrieved data, and optionally the device ID into a barcode (step 927). The system will then cause the print device and/or computing device to output the barcode via a display or via printing on a substrate (step 929). When a user's mobile electronic device captures an image of the barcode, it may decode the barcode and send the captured data to a web service for processing (step 931). The mobile electronic device may receive a response from the web service that corresponds to the data and display it on an application session of the mobile electronic device (step 933) to the user. As described in previous sections of this disclosure, the response may include troubleshooting information, supplies ordering information, or other information that corresponds to the encoded data.

In some embodiments, the print driver session may identify a web service and generate a barcode without user intervention. For example, if the print driver session retrieves an operational parameter that includes a fault code (step 911), it may identify a web service that corresponds to the fault code (step 913), such as a maintenance service. Other services may include a supplies ordering service if the operational parameters include a consumables level, or a backup data service if the operational parameters include configuration parameters.

The computing device may automatically initiate or continue the functions of the print driver session (step 920) to generate the barcode (step 927), such as identifying a URL that corresponds to the web service (step 921), a data string corresponding to the fault code (step 923), and optionally a device ID (step 925) for inclusion in the barcode.

In some embodiments, when the print driver session receives a certain print data, such as a fault code or a low consumables level indication, from a print device, the print driver session may automatically cause the computing device to send a communication to a web service to process the data (step 915). The web service may be a troubleshooting service, a supplies ordering service, or some other service that provides services for the print device. If the communication is successful, then no further action may be required by the print driver session, and the web service can communicate with the computing device via an application such as a browser session (step 919). If the communication fails, then the print driver session may initiate or continue the functions of the print driver session (step 920) that include the barcode generation session described above so that the mobile electronic device may capture the barcode. The print driver session may display the barcode to the user along with instructions to the user for what to do in order to use the barcode to retrieve data from a web service corresponding to the encoded data in the barcode. (See, for example, FIG. 6.)

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of providing print device data to an external system, comprising:
   executing, by a processor of a computing device, a print driver session so that the session:
      causes the computing device to retrieve device operational data from a print device that is associated with the print driver;
      determines that the device operational data from the print device satisfies a condition for which a web service is available;
      presents, to a user, an option to generate a barcode that enables the user to request the web service;
      generates, in response to receiving the user's acceptance of the option, a barcode by encoding the device operational data as a data string with a web address for the web service to which the computing device and print device have no electronic communication connection; and
      outputs the generated barcode.

2. The method of claim 1, further comprising:
   receiving, by a barcode reader of a mobile electronic device, an image of the generated barcode;
   decoding, by the barcode reader, the barcode to detect the web address and the device operational data;
   sending, by the barcode reader, a web service request comprising the device operational data to a web service associated with the web address;
   receiving, by the mobile electronic device, a response that is responsive to the web service request; and
   by the mobile electronic device, outputting the response.

3. The method of claim 1, further comprising, by the processor as part of the print driver session, causing the computing device to select the web service by:
   analyzing the device operational data;
   identifying a category to which the device operational data relates; and
   identifying the web service as a web service that corresponds to the category.

4. The method of claim 3, further comprising, by the processor as part of the print driver session:
   attempting to transmit the device operational data to the web service; and
   determining that the attempt to transmit the data to the web service failed;
   wherein generating the barcode is prompted by the determination that the attempt to transmit the data to the web service failed.

5. The method of claim 1, further comprising, by the processor as part of the print driver session causing the computing device to:
   output a graphical user interface to a user;
   display, via the graphical user interface, at least a portion of the retrieved device operational data;
   receive a user selection of a subset of the displayed device operational data;
   identify a category to which the subset of the displayed device operational data relates;
   select the web service as a web service that corresponds to the category; and
   cause the encoded device operational data to include the selected subset of the displayed device operational data.

6. The method of claim 1, further comprising, by the processor as part of the print driver session, causing the computing device to:
   output a graphical user interface to a user;
   display, via the graphical user interface, a plurality of web services;
   receive a user selection of one of the displayed web services;
   retrieve the device operational data in response to the user selected web service, such that the retrieved device operational data comprises data that corresponds to a category to which the selected web service relates;
   use the user-selected web service as the web service that it encodes into a barcode; and
   use the retrieved device operational data that corresponds to the category as the data string that it encodes into the barcode.

7. A print device information exchange system, comprising:
   a print device;
   a computing device in electronic communication with the print device, the computing device comprising a processor and a non-transitory computer-readable memory containing a print driver that includes programming instructions that, when executed during a print driver session, causes the processor to implement a barcode generation process comprising:
      retrieving device operational data from the print device;
      determining that the device operational data from the print device satisfies a condition for which a web service is available;
      presenting, to a user, an option to generate a barcode that enables the user to request the web service; and
      in response to receiving the user's acceptance of the option, generating the barcode by:
         identifying a web address for the web service;
         encoding the web address and a data string corresponding to the device operational data into the barcode; and
         outputting the generated barcode.

8. The system of claim 7, further comprising:
a mobile electronic device comprising a processor, a display, and a computer-readable memory containing a barcode reading application, wherein the barcode reading application comprises programming instructions that, when executed, cause the processor of the mobile electronic device to:
decode the barcode to detect the web address and the device operational data;
send a web service request comprising the device operational data to a web service associated with the web address;
receiving a response that is responsive to the web service request; and
cause the display to present the response to a user.

9. The system of claim 7, wherein the programming instructions that, when executed during a print driver session, cause the processor to implement the barcode generation process also comprise instructions to cause the computing device to select the web service by:
analyzing the device operational data;
identifying a category to which the device operational data relates; and
identifying the web service as a web service that corresponds to the category.

10. The system of claim 9, wherein the programming instructions that, when executed during a print driver session, cause the processor to implement the barcode generation process also comprise instructions to cause the computing device to:
attempt to transmit the device operational data to the web service; and
determine that the attempt to transmit the data to the web service failed;
wherein generating the barcode is prompted by the determination that the attempt to transmit the data to the web service failed.

11. The system of claim 7, wherein the programming instructions that, when executed during a print driver session, cause the processor to implement the barcode generation process also comprise instructions to cause the computing device to:
output a graphical user interface to a user;
display, via the graphical user interface, at least a portion of the retrieved device operational data;
receive a user selection of a subset of the displayed device operational data;
identify a category to which the subset of the displayed device operational data relates;
select the web service as a web service that corresponds to the category; and
cause the encoded device operational data to include the selected subset of the displayed device operational data.

12. The system of claim 7, wherein the programming instructions that, when executed during a print driver session, cause the processor to implement the barcode generation process also comprise instructions to cause the computing device to:
output a graphical user interface on a display of the computing device;
display, via the graphical user interface, a plurality of web services;
receive a user selection of one of the displayed web services;
retrieve the device operational data in response to the user selected web service, such that the retrieved device operational data comprises data that corresponds to a category to which the selected web service relates;
use the user-selected web service as the web service that it encodes into the barcode; and
use the retrieved device operational data that corresponds to the category as the data string that it encodes into the barcode.

13. A print device information exchange system, comprising:
a print device;
a computing device in electronic communication with the print device, the computing device comprising a processor, a display, and a non-transitory computer-readable memory containing a print driver that includes programming instructions that, when executed during a print driver session, causes the processor to implement a process comprising:
retrieving device operational data from the print device;
identifying a web address for a web service;
attempting to transmit the device operational data to the web service;
determining that the attempt to transmit the data to the web service failed;
in response to determining that the attempt to transmit the data to the web service failed, encoding the web address and a data string corresponding to the device operational data into a barcode; and
outputting, via the display as part of the print driver session user interface, the generated barcode to a user.

14. The system of claim 13, further comprising:
a mobile electronic device comprising a processor, a display, and a computer-readable memory containing a barcode reading application, wherein the barcode reading application comprises programming instructions that, when executed, cause the processor of the mobile electronic device to:
decode the barcode to detect the web address and the device operational data;
send a web service request comprising the device operational data to a web service associated with the web address;
receive a response that is responsive to the web service request; and
cause the display of the mobile electronic device to display the response.

15. A method of providing print device data to an external system, comprising:
executing, by a processor of a computing device, a print driver session so that the session:
causes the computing device to retrieve device operational data from a print device that is associated with the print driver;
causes the computing device to select a web service by:
analyzing the device operational data,
identifying a category to which the device operational data relates, and
identifying the web service as a web service that corresponds to the category;
generates a barcode by encoding the device operational data as a data string with a web address for the web service to which the computing device and print device have no electronic communication connection; and
outputs the generated barcode.

16. The method of claim 15, further comprising, by the processor as part of the print driver session:
attempting to transmit the device operational data to the web service; and determining that the attempt to transmit the data to the web service failed;
wherein generating the barcode is prompted by the determination that the attempt to transmit the data to the web service failed.

17. The method of claim 15, further comprising, by the processor as part of the print driver session, causing the computing device to:
output a graphical user interface to a user;
display, via the graphical user interface, at least a portion of the retrieved device operational data;
receive a user selection of a subset of the displayed device operational data;
identify a category to which the subset of the displayed device operational data relates;
select the web service as a web service that corresponds to the category; and
cause the encoded device operational data to include the selected subset of the displayed device operational data.

18. The method of claim 15, further comprising, by the processor as part of the print driver session, causing the computing device to:
output a graphical user interface to a user;
display, via the graphical user interface, a plurality of web services;
receive a user selection of one of the displayed web services;
retrieve the device operational data in response to the user selected web service, such that the retrieved device operational data comprises data that corresponds to a category to which the selected web service relates;
use the user-selected web service as the web service that it encodes into the barcode; and
use the retrieved device operational data that corresponds to the category as the data string that it encodes into the barcode.

19. A method of providing print device data to an external system, comprising:
executing, by a processor of a computing device, a print driver session so that the session:
outputs a graphical user interface to a user;
displays, via the graphical user interface, a plurality of web services;
receives a user selection of one of the displayed web services;
causes the computing device to retrieve device operational data in response to the user selected web service, such that the retrieved device operational data comprises data that corresponds to a category to which the selected web service relates;
uses the user-selected web service as the web service that the computing device encodes into a barcode;
uses the retrieved device operational data that corresponds to the category as a data string that it encodes into the barcode; and
outputs the generated barcode.

20. The method of claim 19, further comprising, by the processor as part of the print driver session, causing the computing device to select the web service by:
analyzing the device operational data;
identifying a category to which the device operational data relates; and
identifying the web service as a web service that corresponds to the category.

21. The method of claim 20, further comprising, by the processor as part of the print driver session:
attempting to transmit the device operational data to the web service; and
determining that the attempt to transmit the data to the web service failed;
wherein generating the barcode is prompted by the determination that the attempt to transmit the data to the web service failed.

22. A print device information exchange system, comprising:
a print device;
a computing device in electronic communication with the print device, the computing device comprising a processor and a non-transitory computer-readable memory containing a print driver that includes programming instructions that, when executed during a print driver session, causes the processor to implement a barcode generation process comprising:
retrieving device operational data from the print device;
selecting a web service by:
analyzing the device operational data,
identifying a category to which the device operational data relates, and
identifying the web service as a web service that corresponds to the category;
identifying a web address for the web service;
encoding the web address and a data string corresponding to the device operational data into a barcode; and
outputting the generated barcode.

23. The system of claim 22, wherein the programming instructions that, when executed during a print driver session, cause the processor to implement the barcode generation process also comprise instructions to cause the computing device to:
attempt to transmit the device operational data to the web service; and
determine that the attempt to transmit the data to the web service failed;
wherein generating the barcode is prompted by the determination that the attempt to transmit the data to the web service failed.

24. The system of claim 22, wherein the programming instructions that, when executed during a print driver session, cause the processor to implement the barcode generation process also comprise instructions to cause the computing device to:
output a graphical user interface to a user;
display, via the graphical user interface, at least a portion of the retrieved device operational data;
receive a user selection of a subset of the displayed device operational data;
identify a category to which the subset of the displayed device operational data relates;
select the web service as a web service that corresponds to the category; and
cause the encoded device operational data to include the selected subset of the displayed device operational data.

25. The system of claim 22, wherein the programming instructions that, when executed during a print driver session, cause the processor to implement the barcode generation process also comprise instructions to cause the computing device to:
output a graphical user interface on a display of the computing device;
display, via the graphical user interface, a plurality of web services;
receive a user selection of one of the displayed web services;

retrieve the device operational data in response to the user selected web service, such that the retrieved device operational data comprises data that corresponds to a category to which the selected web service relates;

use the user-selected web service as the web service that it encodes into a two-dimensional barcode; and use the retrieved device operational data that corresponds to the category as the data string that it encodes into the two-dimensional barcode.

26. A print device information exchange system, comprising:

a print device;

a computing device in electronic communication with the print device, the computing device comprising a processor and a non-transitory computer-readable memory containing a print driver that includes programming instructions that, when executed during a print driver session, causes the processor to implement a barcode generation process comprising:

outputting a graphical user interface on a display of the computing device;

displaying, via the graphical user interface, a plurality of web services;

receiving a user selection of one of the displayed web services;

retrieving the device operational data in response to the user selected web service, such that the retrieved device operational data comprises data that corresponds to a category to which the selected web service relates;

using the user-selected web service as the web service that it encodes into a barcode;

identifying a web address for the web service;

encoding the web address and a data string, wherein the data string comprises the retrieved device operational data that corresponds to the category, into the barcode; and outputting the generated barcode.

27. The system of claim 26, wherein the programming instructions that, when executed during a print driver session, cause the processor to implement the barcode generation process also comprise instructions to cause the computing device to select the web service by:

analyzing the device operational data;

identifying a category to which the device operational data relates; and identifying the web service as a web service that corresponds to the category.

28. The system of claim 27, wherein the programming instructions that, when executed during a print driver session, cause the processor to implement the barcode generation process also comprise instructions to cause the computing device to:

attempt to transmit the device operational data to the web service; and determine that the attempt to transmit the data to the web service failed;

wherein generating the barcode is prompted by the determination that the attempt to transmit the data to the web service failed.

* * * * *